United States Patent [19]

Amblard

[11] Patent Number: 4,648,422
[45] Date of Patent: Mar. 10, 1987

[54] APPARATUS FOR DRILLING INTO A PIPE UNDER PRESSURE

[76] Inventor: Albert Amblard, 22, rue des Essarts, Bron (Rhone), France

[21] Appl. No.: 726,582

[22] Filed: Apr. 23, 1985

[51] Int. Cl.$^4$ .............................................. F16L 55/18
[52] U.S. Cl. ...................................... 137/318; 408/67; 408/87; 408/100
[58] Field of Search ......................... 137/318; 285/286; 408/137, 138, 67, 83.5, 241 G, 101, 92, 87, 99, 100, 114; 173/32

[56] References Cited

U.S. PATENT DOCUMENTS

| | | | |
|---|---|---|---|
| 2,171,575 | 9/1939 | Cline et al. | 285/18 |
| 2,287,354 | 5/1942 | Misch | 408/101 |
| 2,719,461 | 10/1955 | Hawker | 408/83.5 |
| 2,972,915 | 2/1961 | Milantovits et al. | 137/318 |
| 3,272,033 | 9/1966 | Leopold, Jr. et al. | 408/67 |
| 3,804,545 | 4/1974 | Christov et al. | 408/137 |
| 3,821,965 | 7/1974 | Reynolds | 137/318 |
| 4,090,805 | 5/1978 | Grimsley | 408/138 |

FOREIGN PATENT DOCUMENTS

| | | |
|---|---|---|
| 322665 | 4/1919 | Fed. Rep. of Germany . |
| 2283382 | 1/1974 | France . |
| 2210741 | 10/1976 | France . |
| 1368751 | 8/1971 | United Kingdom . |

Primary Examiner—Donald R. Schran
Assistant Examiner—James L. Welfe
Attorney, Agent, or Firm—Karl F. Ross; Herbert Dubno

[57] ABSTRACT

An apparatus for drilling into a pipe under pressure to form a branch has a casing which can be connected to an isolating valve of a tee-fitting and through which a drill bit passes within the tee-fitting and the valve. The drill bit is surrounded by a barrel sealed with respect to the casing so that the casing rearwardly of the drill bit forms a chamber receiving drilling debris.

12 Claims, 3 Drawing Figures

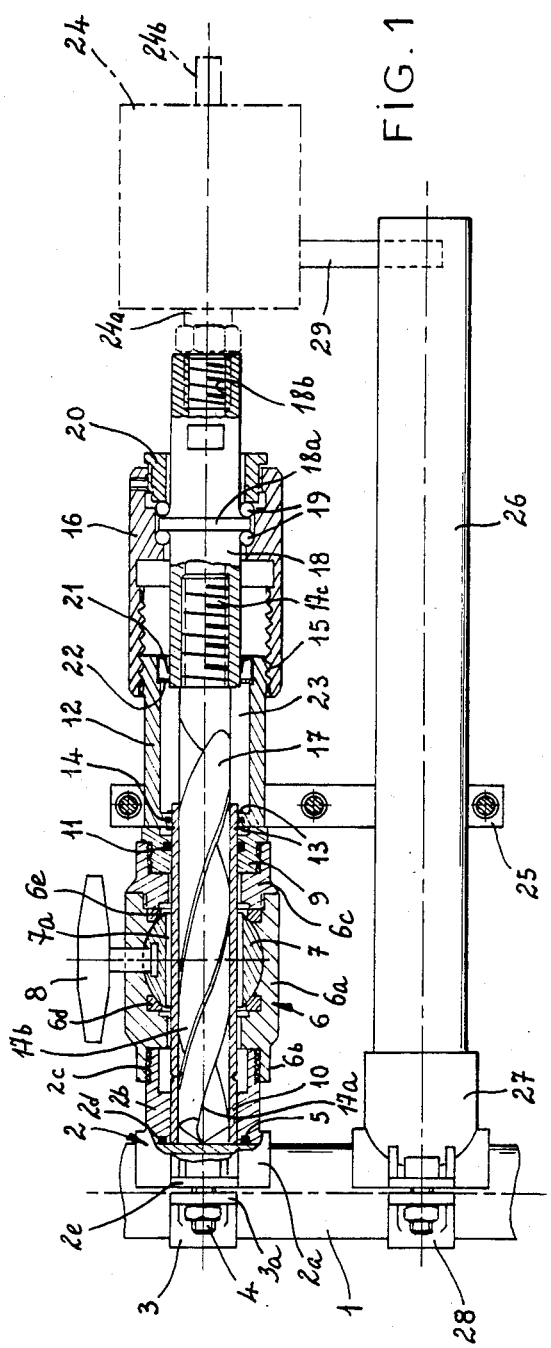
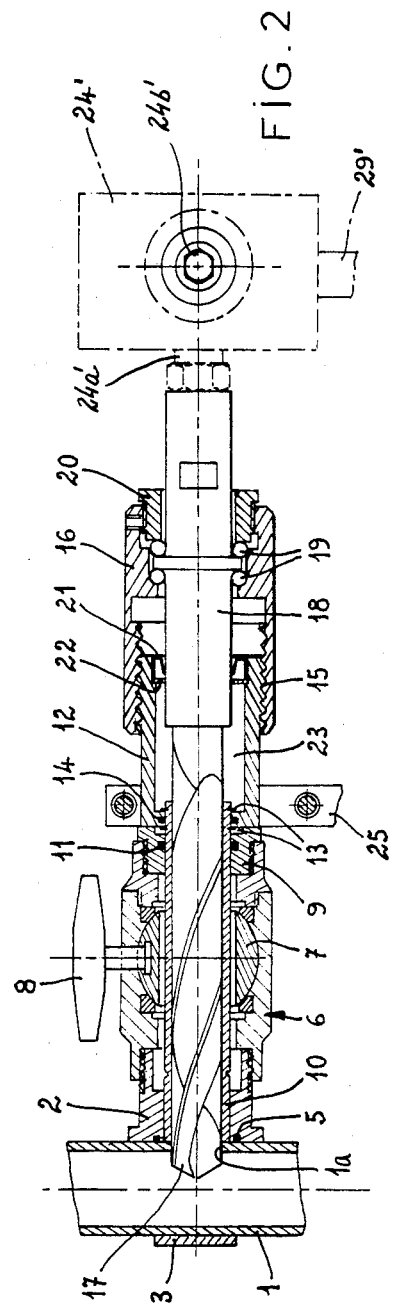

APPARATUS FOR DRILLING INTO A PIPE UNDER PRESSURE

FIELD OF THE INVENTION

My present invention relates to an apparatus or tool enabling the drilling or piercing of a pipe under pressure, e.g. to enable the mounting of a fitting thereon and, more particularly, to an apparatus which enables the formation of a tee or branch along a length of a pipe under pressure without cutting off the pressure or disassembling the pipe.

BACKGROUND OF THE INVENTION

It is frequently necessary to form a connection to a pipe, tube or duct under pressure without cutting or discharging the pipe and without cutting off flow therethrough or materially reducing the pressure in the pipe.

For this purpose, tools have been developed which basically comprise a drill guide which can be attached to the pipe and include a lost fitting which is adapted to be sealed to the pipe around a hole to be drilled therein, a drill bit which can be displaced through the guide and which can be connected to a motor or the like for driving the drill bit and, of course, appropriate sealing means.

It is known, for example, to provide a drill guide or fitting which is to be attached with a valve, through the valve member of which the drill bit can be displaced and which can be then shifted into a closed position once the drill bit is retracted to close off the fitting without pressure loss in the pipe and allow the valve to be attached to a branch pipe or the like.

Tools of this nature are described in the French Certificate of Utility No. 2,210,741 and the French Certificate of Addition No. 2,283,382. Both of these tools permit drilling into a pipe conducting a gas or liquid under pressure without the need to vent or drain this pipe in the formation of a branch into the pipe.

In this arrangement, the casing for the drill is threaded directly onto the isolating valve. The valve is opened and the drill bit is caused to pass through this valve until it engages the pipe wall and drills through the latter. The drill bit is then retracted to permit closure of the valve and, as a consequence, the valve remains in place and serves as the connection to the branch conduit or pipe. Without loss of fluid and, of course, without voiding the interior of the pipe itself, therefore, it is possible to provide a branch to a line or pipe in use.

In several cases the drill bit may be of the coring-drill type or of the milling type which can have a central spur and which is able to cut a ring from the wall of the pipe to be pierced (see the French Certificate of Utility No. 2,210,741, U.S. Pat. Nos. 2,171,575 and 2,287,354 and British Pat. No. 1,368,751).

One advantage of this kind of tool is that the entire volume of the hole cut in the pipe is not converted into chips or debris. Nevertheless these tools are not able to eliminate all of the debris or even a significant amount of debris and thus the debris which is formed can stagnate in the region of the tee which has been premounted on the pipe and which can cause deterioration of elements which cannot be protected from the detrimental effects of such materials.

The drill bit can also be of the auger or helical flute type so that at least part of the debris is drawn away from the hole as it is made. This is the case in the French Certificate of Addition No. 2,283,382. This arrangement also does not solve completely the problem of eliminating chips and other debris forming during the drilling process.

Partial solution to the problem can be found in an analogous device described in German Pat. No. 322 665 where the drill bit is of the helical flute type and is able to eliminate the debris and chips at the pipe of the drill by causing the debris to collect in an annular chamber surrounding the tool. This chamber is located at the level of attachment of the drill structure to the tee or the fitting and is defined externally by a sleeve which surrounds the tool and which must, therefore be introduced together with the tool into the valve.

Obviously, because the chamber-defining sleeve must also be introduced through the valve and the cross section of the valve in its open position is limited, the size of the chip or debris-collecting chamber is likewise limited and the discharge of detritus from this chamber is difficult at best.

Furthermore, when the tool of prior art devices for the purposes described conforms to that of the drill bit of the helical flute type, the tool is either without protection as is the case with the tool of the French Certificate of Addition No. 2,283,382 or is protected only over a limited portion of its length as is the case with German Pat. No. 322 665 or poses a danger to the seals of the isolating valve.

OBJECTS OF THE INVENTION

It is the principal object of the present invention, therefore, to provide an improved apparatus enabling the branching of a pipe under pressure whereby all of the disadvantages outlined above are eliminated.

Another object of the invention is to provide an improved apparatus for the purposes described which, however, conveniently and efficiently eliminates chips and other debris and drilling turnings from the branch fitting or tee which is to be applied and also protects all of the elements of the tool as well as the seals of the valve.

SUMMARY OF THE INVENTION

These objects and others which will become apparent hereinafter are attained, in accordance with the present invention, in an apparatus adapted to branch a pipe under pressure and which comprises a tee fitting which can be affixed to this pipe, e.g. by a saddle structure clamped by wiring against the pipe and having a generally radial tubular portion, an isolating valve affixed to this tubular portion and having a valve member displaceable into an open position in which a valve passage is aligned with this tubular member, an auger-type drill bit, i.e. a drill bit having one or more helical flutes or grooves running from its cutting end toward the shank of the drill bit, a barrel closely surrounding the drill bit and dimensioned to press with the drill bit through the tubular member and the valve passage, and means defining an annular chamber outwardly of this passage at an end of this barrel wholly outside the valve and remote from the end of the barrel adapted to bear against the wall of the pipe around the hole which is bored therein, the chips, turnings and debris being entrained by the grooves along the interior of this barrel and into the annular chamber disposed at the end of the barrel outside of the valve.

The guide sleeve or barrel, according to the invention, can thus protect the bit during its entire traverse of the valve and the tee fitting until it reaches the wall of the pipe to be pierced while, at the same time, the annular chamber which collects and stores the chips and turnings is located at the rear of this valve, i.e. is spaced away from the valve in the direction opposite that along which the pipe is located.

The barrel can have a comparatively thin wall so that the diameter of the bit can be close to that of the passage in the valve and need not depend upon the diameter of the annular chamber in which the debris is to be collected or vice versa. As a consequence, the diameter of the valve can be independent of the diameter of the debris-collecting chamber and conversely the diameter and thus the capacity of the debris-collecting chamber can be independent of the diameter of the passage in the valve when the latter is in its open position.

During operation, a close hugging relationship of the barrel and the auger-type bit constitutes of the assembly, a worm or screw conveyor which entrains the turnings or other debris rearwardly into the annular debris chamber.

The turnings or other drilling debris are thus completely confined within the barrel and are prevented from remaining in the tee or fitting or in the isolating valve so that these elements are protected from contamination by such debris. Furthermore, the barrel prevents rotating portions of the drill bit from coming into contact with any sensitive portion of the valve or of the tee fitting. Because of the location of the debris-collecting chamber, moreover, comparatively large amounts of debris can be collected and can be readily evacuated toward the exterior.

Preferably the guiding and protecting barrel passes freely through a screw connection between the housing of the drill bit and the isolating valve. Means can be provided, in addition, to form an annular seal around the barrel adjacent the end of the valve. In this case, the housing, its seal, the barrel, the drill bit and the drive for the latter can form an assembly which is completely independent from the isolating valve or the tee-fitting and, indeed, one which does not apply force to the valve or the tee fitting.

In a preferred embodiment of the invention, the device comprises a drive ring which can be threaded into a screwthread at the rear end of a casing. A shank or spindle for entraining the drill bit is mounted within the interior of the ring and is axially connected to the latter. The speed of advance of the tool via the ring can thus be easily controlled by the operator, can rotate the ring to displace the spindle axially inasmuch as the spindle and hence the drill bit are coupled to the ring.

Advantageously, an annular lip seal of an elastomer, protected by a metal collar, is mounted between the casing and the entrainment spindle of the drill bit to ensure a sealing of the rear of the debris-collection chamber and thus preventing any gap from forming and permanently precluding all leakage from the chamber.

The screwthread of the casing, onto which the drive ring is threaded, is preferably of an inverse pitch with respect to the sense of rotation of the entrainment speed, for example, a left-hand screwthread when the rotation of the spindle in the opposite or right-hand sense. This prevents the rotation of the spindle and hence of the drill from resulting in an undesirable codirectional rotation of the ring and hence a blocking or jamming of the assembly in an undesirable manner.

According to another feature of the invention the casing is connected by a support arm to a member extending parallel to the axis of the drill and which can be mounted temporarily upon the pipe by a collar or the like.

In this matter I am able to take up the axial rearwardly directed forces during operation of the drill and thus prevent distortion and misalignment of the drain.

It will be appreciated that it is very important to prevent distortion of the tee fitting which is to be affixed to the type and hence that the actual drilling operation should be in line with the axis of the tee fitting without the generation of force couples in any off-axial direction. This is completely assured by providing the aforementioned guide parallel to the axis of the drill bit and connecting the assembly to that guide so that all off-axial forces are taken up by that guide and are prevented from being applied to the tee. This has also been found to guarantee the stability of the tee or long life thereof and against material fatigue.

Danger of inappropriate tension forces on any of the sensitive parts during the drilling operation is precluded. The guide device also has the advantage that it simplifies the work of the operator since he need only be concerned with controlling the rate of advance of the drill bit. This control may be effected by a screw mechanism which can easily block or withstand the internal pressure in the pipe and which will allow progressive retraction of the tool after piercing of the pipe without problems arising from the pressure of the fluid therein.

A speed reducer, having the function of a force-couple multiplier, can be provided between the drive motor of the drill and the shank or spindle rotating the drill bit so that one can use, for example, a conventional electric hand drill as a drive motor. This speed reducer, therefore, enables even low-power motors of high speed to work effectively even for the drilling of holes of comparatively large diameters. The speed reducer can be of the in-line type in which the input and output shafts are aligned or of the angle type and the selection of the reducer used will depend upon the availability of space.

BRIEF DESCRIPTION OF THE DRAWING

The above and other objects, features and advantages of the present invention will become more readily apparent from the following description, reference being made to the accompanying drawing in which:

FIG. 1 is an axial sectional view through the apparatus of the invention showing the beginning of the drilling operation and utilizing an in-line speed reducer;

FIG. 2 is a view of the apparatus of FIG. 1 in which the speed reducer has been replaced by an angle reducer and in which the drill bit has pierced the pipe.

SPECIFIC DESCRIPTION

Figure 3:
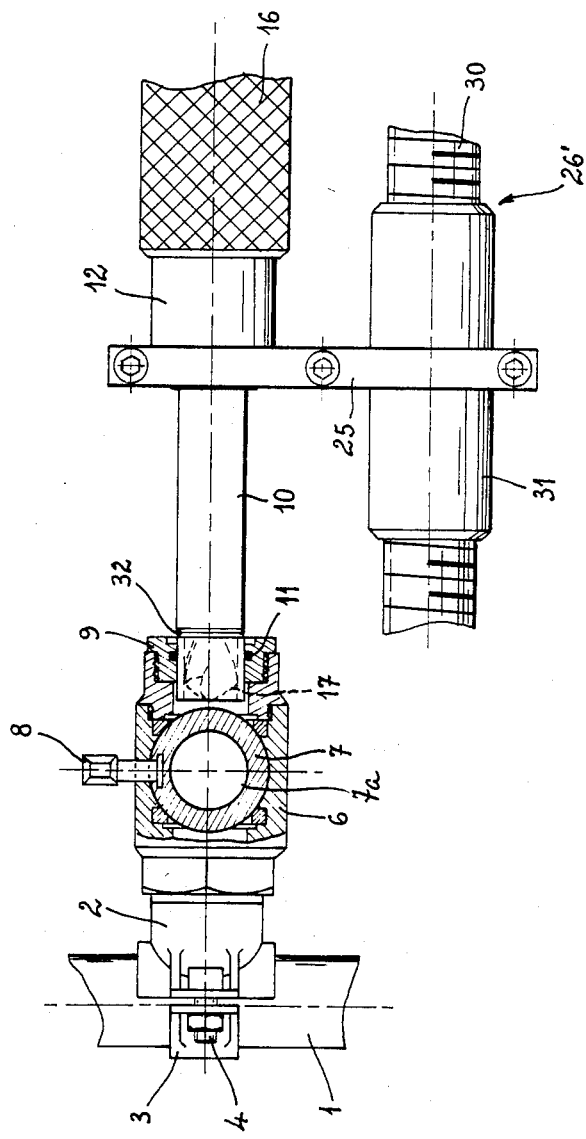
FIG. 3 is a view similar to FIG. 2 or FIG. 1 showing the position of the apparatus in which the valve has been closed and the bit retracted but illustrating a different construction of the axial guide means for the device.

In the drawing, the same reference numerals have been used to identify identical structural elements in all embodiments.

The apparatus of the invention is intended to allow a tee-fitting to be applied to a pipe 1 which is traversed by a fluid, e.g. a liquid or gas, under pressure.

At the location at which the tee-fitting or branch is to be applied, the tee-fitting 2 is mounted. The tee-fitting 2 has an apron 2a in the form of a shell which has a radius of curvature corresponding to that of the outer periphery of the pipe and has an annular groove at the base of a cylindrical fitting 2b which is externally threaded at 2c. The groove 2d receives a sealing ring 5 which can be an O-ring. A pair of lateral lugs, one of which can be seen at 2e (while the opposite lug is diametrically opposite the line shown), can be drawn toward a pair of lugs 3a of a saddle 3 engaging the opposite side of the pipe 1 by respective bolts 4 of which only one is visible in FIG. 1.

The tubular fitting or member 2b thus lies perpendicular to the axis of the pipe.

On the threaded end 2c of the member 2b is mounted an isolating valve 6, the latter comprising a valve body 6a formed with a pair of female-threaded bosses 6b and 6c, the former being threaded onto the tee-fitting while the latter can be used to join a branch pipe if desired. A valve member, e.g. a ball 7, is rotatable within the housing 6a by a handle 8 and is formed with a passage 7a which can be aligned with the passage in member 2b when the valve is in its open position as seen in FIGS. 1 and 2, the closed position of the valve being represented in FIG. 3.

A pair of sealing rings 6d and 6e composed of a low-friction material such as a nylon or Teflon flank the ball 7.

The drilling device or apparatus of the invention comprises a connecting member 9, here shown to be an externally threaded sealing element which can be screwed into the valve 6 and can simultaneously form a guide for the barrel 10 which serves to protect the drill bit 17 which is of the conventional fluted or grooved type having helical grooves 17a and 17b.

The barrel 10 can pass axially through the valve and the tee-fitting as can be seen in FIGS. 1 and 2 and come to bear against the wall of the pipe 1 around the hole 1a which is drilled therein by the bit 17 (compare FIGS. 1 and 2). An annular seal 11 sealingly surrounds and engages the barrel 10 and prevents leakage around the exterior of the barrel. The barrel 10 traverses the guide connector 9 and there is no rigid mechanical connection between the connector 9 and the barrel 10.

Rearwardly of the connector 9, the barrel 10 is fixed to the casing 12 by a pair of spring rings or Circlips and by a sealing ring 14 preventing leakage between the exterior of the barrel and the interior of the casing.

The rear end of the casing 12 is provided with an external screwthread which receives a drive ring 16 which can be threaded onto the screwthread 15.

The drill bit 17 rotates freely within the barrel 10 but is closely surrounded by the latter so that its helical flutes form a worm-type pump or conveyor displacing detritus to the rear, i.e. to the right.

Shank 17c of this drill bit can be conical in the form of a Morse taper but preferably is threaded as is seen from FIG. 1 and can be connected to an entrainment spindle 18 mounted within the advancing or drive ring 16 and to which it is connected by a pair of thrust bearings 19 permitting free rotation of the spindle within the ring 16. The ring 16 can be knurled or milled (see FIG.3) to allow it to be engaged by the hand of an operator for control rotation of this ring.

A screw 20, in the form of an adjustment ring threaded into the ring 16, allows adjustment of axial play of the spindle 18 and the ring 16. The rows of bearings 19 flank a shoulder 18a on the spindle. The spindle 18 has a screwthread 18b allowing it to be coupled to an output shaft 24a of a speed reducer 24 of the in-line type whose input shaft 24b can be engaged in the chuck of an electric drill or the like.

The screwthread 15 ensures connection between the advancing ring 16 and the casing 12 and is preferably of the opposite hand to the rotation of the drill bit 17, e.g. a left-hand thread for right-hand rotation of the drill bit.

The sealing between the entrainment spindle 18 and the casing 12 is effected by an annular lip seal 21 which is in turn protected by a collar 22 disposed ahead of this seal.

The annular chamber 23 defined between the drill bit 17 and the casing 12 serves as a debris-collection chamber for the turnings and chips.

When the spindle 18 is rotated in the manner described, e.g. with a low power motor, such as an electric drill motor without speed variability, and the ring 16 is rotated, the drill is driven into the pipe 1 and can pierce the latter.

FIG. 2 shows that the speed reducer 24' can be of the angle type, i.e. its input shaft 24b' lies at a right angle to its output shaft 24a. In the embodiment of FIG. 1, for example, the speed reducer may be of the planetary type whereas in the embodiment of FIG. 2 the speed reducer may be of the worm/worm gear type or a bevel pinion type.

The casing 12 is also connected by a lateral support arm 25 slidably to a guide 26 which takes up rotary or torque couples and off-axial forces. The bar 26, which can be a pipe, lies parallel to the axis of the drill bit 17.

The front end of the guide 26 is rigid with the pipe 1 as a result of the temporary attachment by a saddle 28 and a tee-fitting 27 to the latter. The speed reducer 24 or 24' likewise has an arm 29 or 29' adapted to transmit reaction forces to the guide 26.

Once the apparatus is assembled as shown in FIG. 1 with the valve opened and the assembly sealed by the ring 5, the connector 9 can be threaded into the valve and the motor started. The ring 16 is rotated manually and the drill slowly advanced through the barrel 10 until it pierces the pipe (FIG. 2). The position before drilling commence, shown in FIG. 1, can be ascertained by coincidence in a common plan of the forward end of ring 16 and the end of the thread 15 on the casing.

Naturally, the guide 26 was previously positioned on the pipe with the play between the two members 27 and 28 being a function of the diameter of the pipe to be drilled. The guide 26 ensures alignment of the drilling apparatus and the absorption of all forces with the exception of the axial advance force.

Obviously, the adjustment required between members 27 and 28 is minimal when the device is repeatedly used on pipes of the same diameter.

The reducer 24' can then be connected to the spindle 18 and the electric drill motor applied to the reducer. By slowly turning the ring 16 the drill is advanced until it passes through the pipe (FIG.2). This position can correspond to a visible relationship between a particular marking on the casing 12 and the leading end of the ring 16, the various markings indicating different pipe thicknesses.

The final position of the drill has been shown in FIG. 2.

During drilling, the turnings and other debris are carried by the flutes of the drill to the rear, i.e. to the right, with the barrel 10 and thus none of these detritus need remain within the tee or is capable of detrimentally affecting the valve.

The drill is then retracted by rotating the ring 16 in the opposite sense and the assembly 26 through 28 can then be dismounted. The retraction of the entire assembly in the gradual manner can be effected as shown in FIG. 3 by relatively rotating the shaft 30 which can form a guide 26' equivalent to the guide 26 and an internally threaded sleeve 31 connected to the arm 25. This threaded arrangement 30, 31 allows the barrel 10 and thus assembly 10, 12, 16, etc. to withstand extremely high pressure as may now be released from within the pipe 1. When the barrel 10 is sufficiently retracted (FIG. 3) the valve 6 can be closed and the connector 9 removed.

The valve 6 can be opened briefly to discharge liquid or other fluid from the pipe 1 and thereby rinse out any traces of debris which may remain. This step can be facilitated by temporarily mounting a flexible hose on the valve 6 so that liquid forming the purged liquid, e.g. the water, can be collected in receptacles. A pipe can then be connected to the valve to form a branch.

The embodiments illustrated, of course, can be deviated from, in accordance with the principles of the invention, without departing from the spirit and scope of the impending claims by, for instance, making the barrel 10 and the casing 12 unitary with one another, utilizing a single ball bearing 19 instead of the double race shown, or utilizing an auger or other rotatable tool in place of the drill 17 as long as the same debris displacement is effected.

A motor especially designed can be provided in place of the reducer and drill motor assembly described and a simple connection can be provided between the spindle and the motor.

The assembly 30, and 31 can be mechanized, i.e. driven by a motor, and this assembly can be replaced by a hydraulic drive mechanism controlled, for example, by a source of oil and a control valve arrangement, e.g. a hydraulic jack control system.

I claim:

1. An apparatus for drilling a pipe under pressure to form a branch, comprising:
    means forming a tee-fitting secured to said pipe at a location adapted to form a branch;
    an isolating valve mounted on said tee-fitting and having a passage in an open position of said valve;
    a barrel extending continuously through said tee-fitted and said valve from a wall of said pipe to a location remote from said wall and beyond said valve;
    a drill bit rotatable in and closely surrounded by said barrel, said drill bit having flutes for carrying drilling debris formed upon drilling through said wall to said location;
    a connector releasably connected to said valve and sealingly engaging said barrel, said barrel extending through said connector, said location lying beyond said connector; and
    a casing having a greater internal diameter than the external diameter of said barrel and being radially spaced from said wall by less than the axial lengths of said flutes, said casing surrounding said drill bit at said location with all-around clearance to define with said drill bit a debris-receiving compartment while said drill bit is drilling through said wall, said casing being connected to said valve by said connector, said flutes extending into said compartment to deliver debris removed from said wall to said compartment.

2. The apparatus defined in claim 1 wherein said connector is threadedly engageable with said valve and surrounds said barrel without mechanical connection therewith, said apparatus further comprising a sealing ring disposed between said connector and said barrel.

3. The apparatus defined in claim 2 wherein said casing is formed with a screwthread at a rear end thereof, said apparatus further comprising an advance ring axially coupled to said drill bit and engaging said screwthread for advancing said drill bit upon rotation of said ring.

4. The apparatus defined in claim 3, further comprising a screwthreaded into said ring for adjusting play between said drill bit and said ring.

5. The apparatus defined in claim 3, further comprising a lip seal protected by a collar between said casing and a spindle engaging said drill bit at a rear end of said chamber.

6. The apparatus defined in claim 3 wherein said screw thread has an opposite hand from the sense of rotation of said drill bit.

7. The apparatus defined in claim 3 wherein said means for rotating said tool bit includes a speed-reduction gearing.

8. The apparatus defined in claim 7 wherein said speed reduction gearing is of the in-line type having axially aligned input and output shafts.

9. The apparatus defined in claim 7 wherein said gearing is of an angle type having input and output shafts at right angles to one another.

10. The apparatus defined in claim 3, further comprising guide means mounted on said pipe and connected to said casing for taking up off-axial forces generated therein.

11. The apparatus defined in claim 10, further comprising means on said guide means for gradual retracting of said casing away from said pipe.

12. The apparatus defined in claim 11 wherein said means on said guide means is a screwthread arrangement.

* * * * *